US005421922A

United States Patent [19]

Sperber

[11] Patent Number: 5,421,922

[45] Date of Patent: Jun. 6, 1995

[54] METHOD FOR APPLYING A FOAMED FIBER INSULATION

[75] Inventor: Henry Sperber, Englewood, Colo.

[73] Assignee: Laboratorios Del Dr. Esteve, S.A., Barcelona, Spain

[21] Appl. No.: 191,142

[22] Filed: Feb. 2, 1994

Related U.S. Application Data

[63] Continuation of Ser. No. 875,623, Apr. 28, 1992, abandoned, which is a continuation-in-part of Ser. No. 744,367, Aug. 13, 1991, Pat. No. 5,131,590.

[51] Int. Cl.[6] .......................... B32B 5/16; B32B 5/20; E04F 13/12; E04F 13/16

[52] U.S. Cl. ........................................ 156/71; 156/77; 156/78; 264/48; 427/244

[58] Field of Search ...................... 156/77, 78, 71, 60; 427/244; 264/42, 45.3, 48; 239/8, 9, 419.3, 427, 427.5, 428

[56] References Cited

U.S. PATENT DOCUMENTS

| | | | |
|---|---|---|---|
| 2,941,900 | 6/1960 | Schroder-Stranz | 427/244 |
| 3,050,427 | 8/1962 | Slayter | 156/78 |
| 3,302,362 | 2/1967 | Lang | 156/71 |
| 3,641,724 | 2/1972 | Palmer | 156/78 |
| 3,649,324 | 3/1972 | Payne | 427/244 |
| 3,870,588 | 3/1975 | Yamamoto | 156/78 |
| 3,957,209 | 5/1976 | Thomson | 239/429 |
| 3,974,965 | 8/1976 | Miller | 239/413 |
| 4,084,980 | 4/1978 | Motoki | 106/601 |
| 4,103,876 | 8/1978 | Hasselman, Jr. et al. | 366/178 |
| 4,135,882 | 1/1979 | Harkness et al. | 422/133 |
| 4,213,936 | 7/1980 | Lodrick | 422/133 |
| 4,225,086 | 9/1980 | Sandell | 239/428 |
| 4,284,447 | 8/1981 | Dickens | 156/78 |
| 4,402,892 | 9/1983 | Helser | 264/42 |
| 4,447,560 | 5/1984 | Piersol | 521/68 |
| 4,487,365 | 12/1984 | Sperber | 239/8 |
| 4,530,468 | 7/1985 | Sperber | 239/419.3 |
| 4,712,347 | 12/1987 | Sperber | 52/404 |
| 4,768,710 | 9/1988 | Sperber | 239/8 |
| 4,787,131 | 11/1988 | Pacca | 29/401.1 |
| 4,923,121 | 5/1990 | Boyer | 239/434.5 |

*Primary Examiner*—Michael W. Ball
*Assistant Examiner*—Daniel J. Stemmer
*Attorney, Agent, or Firm*—Dressler, Goldsmith, Shore & Milnamow, Ltd.

[57] ABSTRACT

A foamed adhesive insulation, consisting of a mixture of a foamed adhesive material and a fibrous insulation material, is provided which adheres to a desired surface without the need for a retaining means to hold the mixture in place. While in the flowable state, the foamed fiber insulation can be molded to a desired shape and texture. The foamed fiber insulation adheres and can be applied to substantially any surface, such as wood, metal, masonry, concrete, or urethane, with virtually any orientation. The compression and tensile strengths of the layer of foamed fiber insulation can be selected by adjusting the mixture of foamed adhesive material and insulation particles. The foamed fiber insulation can include additives such as a dye to produce a substantially rigid insulation layer of a desired color, or a fire retardant material to produce a fire retardant insulation layer.

8 Claims, 5 Drawing Sheets

METHOD FOR APPLYING A FOAMED FIBER INSULATION

CROSS REFERENCE TO RELATED APPLICATIONS

This is a continuation of co-pending application Ser. No. 07/875,623, filed on Apr. 28, 1992, now abandoned, which application is a continuation-in-part of copending U.S. application Ser. No. 07/744,367, filed Aug. 13, 1991, now Pat. No. 5,131,590.

FIELD OF THE INVENTION

The present invention relates to a method for insulating an existing or newly constructed structure in which a mixture of a foamed adhesive material and a fibrous insulation material are caused to adhere the structure without the need for a retaining means to hold the mixture in place.

BACKGROUND INFORMATION

Methods for supplying fibrous insulating materials by injection under air pressure provide a generally economical method of insulating a desired space. Such methods are economical at least partly because relatively inexpensive fibrous materials such as cellulose, or mineral fibers, fiberglass and the like can be used, as described, for example, in U.S. Pat. No. 4,487,365, issued Dec. 11, 1984, to Sperber; U.S. Pat. No. 4,530,468, issued Jul. 23, 1985, to Sperber; U.S. Pat. No. 4,712,347, issued to Sperber; and U.S. Pat. No. 4,768,710, issued Sep. 6, 1988, to Sperber and also because of the relative speed with which the insulation can be injected under air pressure compared with the installation of batt-type insulation.

There are two primary methods for supplying fibrous insulating materials by injection under air pressure. In the first, insulation particles mixed with adhesive are inserted into the space between the outer and inner walls of the structure. Since it is desirable to "blow in" the insulation particles and adhesive mixture prior to the construction of the inner walls, a retaining means, as described, for example, in U.S. Pat. No. 4,712,347, by Sperber, issued Dec. 15, 1987, is typically used to retain temporarily the insulation between the wall framing until the inner wall can be constructed to act as a permanent retaining barrier.

The process of blowing-in fibrous insulation has at least one major drawback. The process typically produces insulation with non-homogeneous density. The nonhomogeneity is caused both by the later portions of blown-in insulation impacting and compacting the first portions of blown-in insulation and by the settling of the fibers over time. In general, compacted or densified fibrous insulation has a lower insulating capacity compared to less dense or uncompacted fibrous insulation. Although an adhesive can be used to assist in maintaining the loft of fibrous insulation, as described in U.S. Pat. Nos. 4,487,365; 4,530,468; and 4,712,347, above, the adhesive may have insufficient time to set, cure or dry before impaction from succeeding portions of insulation occurs and may have insufficient strength to withstand the force of impact from succeeding portions of blown-in insulation. Additionally, the adhesive by itself may not be sufficiently spread or mixed with the fibers to provide the desired separation of the fibers.

In the second method for supplying fibrous insulating materials by injection under air pressure, lofted fibers of insulation are mixed with a foam to provide a blown-in fibrous insulation which has a substantially homogeneous density, providing for uniformity of insulation, as disclosed in U.S. Pat. No. 4,768,710. The lofted insulation fibers are created by the mixture of substantially dry fibrous particles with pressurized air. Similarly, the foam is created by the mixture of a foaming agent with pressurized air. The foam and lofted fibers are then introduced into the mixing chamber of a nozzle. Although not discussed in the '710 patent, a single mixing hose is typically connected to the nozzle. The inside diameter of the mixing hose is greater than that of the nozzle outlet. In the mixing chamber and mixing hose, the foamed material is mixed with the lofted fibers so that the foam maintains the loft or the desired spreading of the insulation fibers relative to each other. The length of mixing hose can be approximately two feet. The mixture of fibers and foam material is carried under pressure away from the mixing hose into the desired space, but without any velocity, where the foam maintains the desired loft or spreading of the insulation fibers to achieve a uniform density of the insulation over time.

Like the first method, the apparatus and method of U.S. Pat. No. 4,768,710, has a significant limitation. The apparatus does not eject the foam/insulation mixture with sufficient velocity to cause the mixture to adhere to a surface, even though an adhesive material has been incorporated into the mixture. Rather, as in the first method, placement of the mixture requires the use of some means to retain temporarily the insulation between the wall framing until the inner wall can be constructed to act as a permanent retaining barrier.

In contrast to loose fibrous insulation, insulation comprising a solid "foam" is used in some applications. Although fibrous material can be incorporated into such foam as crystallization sites, fillers, reinforcements and/or pacifiers, as described in U.S. Pat. No. 4,402,892, issued Sep. 6, 1983, to Helser, it is the solid foam itself, rather than the fibers, which produces the insulation effect. To enable such insulation to fill a void, it is first produced in a fluent form and then cured or dried to form the solid foam. Thus, the fluent foam must be capable of substantial solidification into a permanent body. Materials which are capable of this solidification such as a cementitious material, as described in the Helser patent, or resin materials as described in U.S. Pat. No. 4,103,876, issued Aug. 1, 1978, to Hasselman, Jr. et al. and U.S. Pat. No. 4,135,882, issued Jan. 23, 1979, to Harkness et al. are typically more expensive than fibrous insulation materials. Furthermore, many solid foam insulation materials require relatively expensive and time-consuming additional steps to accomplish curing or drying, such as a heating step.

U.S. Pat. No. 4,447,560, issued May 8, 1984, to Piersol describes forming a fibrous sheet by agitating a mixture of a foamable solution and a slurry of binder-coated insulation fibers to homogeneously suspend the fibrous slurry. The present invention differs from the subject matter of the Piersol patent in several important respects. First, unlike the Piersol patent, the present invention does not utilize a slurry of fiber and binder materials but requires the use of pressurized air to provide spreading of insulation fibers to achieve a desired degree of fiber "fluffiness." Second, the foam material desired herein is already in its agitated state when it is mixed with the fibers. Third, the insulation mixture of the present invention is directly sprayed under pressure into a formed cavity at a building construction site; there is no formation of a batt-type insulation or a standard sheet of fibrous material. Finally, there is no step of heating for drying purposes after the insulation material is located in the cavity.

A common denominator for insulating methods using either blown in fibrous insulation or solid foam or batt-type insulation is the substantial construction labor and materials required to provide a structure to accommodate the insulation. For example, for loose fibrous insulation, a building contractor first typically constructs a cavity for the insulation by attaching a temporary retaining structure to a series of studs spaced at regular intervals in the wall. After the fibrous insulation is inserted into the cavity, a permanent retaining structure, such as drywall, is nailed to the studs. Expensive fire retardant drywall is sometimes used to decrease fire danger. To provide a wall amenable to finishing such as painting or wallpapering, a drywall finisher must fill and finish not only the seams between the drywall panels but also each of the innumerable nail indentations in the drywall. Not surprisingly, this process is time and labor intensive and substantially increases already high construction expenses.

Insulating methods using either solid foam or batt-type insulation are even more expensive than loose fibrous insulation. A building contractor must not only perform the above-noted construction steps (with the exception of the erection of a temporary retaining means) to accommodate the insulation but also use must incur additional expenses required to manually install the insulation in a wall cavity. For example, batt-type insulation is typically inserted into a cavity and then stapled to the surrounding studs. Additionally, solid foams require relatively expensive and time-consuming steps to accomplish curing or drying, such as a heating step.

Based on the foregoing, there exists a need for method for applying insulation that reduces the costs associated with present methods of installing insulation. More specifically, there is a need for a method of applying insulation that substantially eliminates, the need for the construction of a retaining structure. It would be particularly advantageous to have a method to apply insulation in which the insulation could be molded, preferably substantially simultaneously with its application to desired shapes and textures. Further, there is a need for an insulating method that, in appropriate circumstances, eliminates the need for a permanent retaining structure, such as drywall. Stated another way, there is a need for a method of insulating that produces an insulating structure that can also serve as a wall, ceiling, or like structure which can be painted, wallpapered or otherwise textured. Further, in the situations in which the use of drywall or similar surfaces is appropriate, there is a need for a method of insulating that reduces the costs associated with the hanging and finishing of drywall. Additionally, there is the further need for an insulating method that reduces the costs associated with providing a fire resistant structure. Moreover, there is a need for a method of insulating that can reduce costs associated with painting the structures that presently overlay the insulating layer in a building. Finally, there is a need for an insulation which can not only adhere to a wall but also can have its strength and insulating properties altered to correspond with the needs of specific applications.

SUMMARY OF THE INVENTION

The present invention provides a novel method for insulating buildings that substantially eliminates the need for erecting a retaining structure to accommodate the insulation. The method includes the steps of applying foamed fiber insulation, a foamed adhesive binder mixed with insulation particles, while in a flowable state to a desired surface. The foamed fiber insulation adheres to the surface and, while in the flowable state, may be molded to a desired shape and texture. In another embodiment, the foamed fiber insulation may be substantially simultaneously shaped as the foamed fiber insulation is sprayed to the desired thickness and the need for an additional step to contour the insulation eliminated. The foamed fiber insulation subsequently cures to form a substantially rigid layer which retains the desired shape and texture. The foamed fiber insulation adheres and may be applied to surfaces such as wood, metal, masonry, concrete, stucco, or urethane. Moreover, the foamed fiber insulation can be applied to surfaces having varying orientations, such as wall and ceilings. Accordingly, a wide variety of surfaces may be insulated without the need for the construction of a temporary or permanent retaining structure, thereby substantially reducing construction costs.

The ability of the foamed fiber insulation to be molded into any desired shape or texture while in the flowable state permits the resulting rigid layer to be used as a wall, ceiling or similar structure that can be finished without the installation of drywall or some other type of wallboard, as is required by existing insulation methods. After the foamed fiber insulation is contoured to the desired shape and texture and cures to a substantially rigid state, it may be painted, wallpapered, or left unfinished, as desired.

If drywall is to be employed, it may be cemented to the exposed surface of the cured foam fiber insulation. This obviates the need for drywall to be nailed to studs and simplifies and reduces the expense of the drywall finishing process by eliminating the presence of nail indentations in the drywall. Consequently, the drywall finisher need only fill and finish the seams between the drywall panels.

The compression and tensile strengths of the insulation layer may be selected by adjusting the mixture of foamed adhesive material and insulation particles. The compression and tensile strengths and "R" rating of the layer are directly proportional to the density of the insulation particles in the layer and inversely proportional to the density of foamed adhesive material. In other words, the greater the density of insulation particles and the lower the density of foamed adhesive material, the greater the compression and tensile strengths of the layer and the "R" rating. Accordingly, the insulation layer may have a lower density of insulation particles and a greater density of foamed adhesive material in areas requiring less strength and a lower "R" rating, such as ceilings, and a higher density of insulation particles and a lower density of foamed adhesive material in areas requiring greater strength and a higher "R" rating, such as walls which will frequently contact people or heavy objects. The amount of insulation particles may also be attenuated to produce a foamed fiber insulation with few insulation particles that can be applied to the desired surface for dust suppression and the like.

The foamed fiber insulation may include additives such as a dye to produce a substantially rigid insulation layer of a desired color and thereby eliminate the need to paint the insulation. Additionally, the foamed fiber insulation may incorporate a fire retardant material to produce a fire retardant insulation layer. The ability of the insulation to itself be fire resistant reduces the need for expensive fire retardant drywall or other measures to reduce flammability.

Copending application having Serial No. 07/744,367, now Pat. No. 5,131,590, discloses an apparatus and method useful in providing a fibrous insulation mixture which is sprayed under pressure into a desired space where the mixture adheres to surfaces of the space. In this manner, no retaining means is necessary to retain the mixture in the desired space. The mixture has a substantially homogeneous density of fibrous insulation so as to provide for uniformity of insulation. Substantially dry fibrous particles are mixed with pressurized air to produce lofted fibers which are introduced into the mixing chamber of the nozzle and then into a mixing hose. A foaming agent and adhesive are mixed with pressurized air to create a foamed adhesive material which is also introduced into a mixing chamber of a nozzle and then into a mixing hose. In the mixing chamber and mixing hose, the lofted fibers are substantially mixed with the foamed adhesive material so that the foam maintains the loft or the desired spreading of the insulation fibers relative to each other. The mixture of fibers and foamed adhesive material is introduced from the mixing hose into a spraying assembly consisting of a plurality of hoses of different inner diameters with the inner diameter of each hose being less than the inner diameter of the nozzle. The mixture of the fibers and foamed adhesive material is ejected from the spraying assembly with a velocity sufficient to cause the mixture to adhere to a surface while substantially reducing separation between the fibers and foam and adhesive material and continuing to maintain the desired loft or spreading of the fibers to achieve uniformity of the insulation. Because of the presence of the foamed adhesive material, the lofted fibers in the desired space are able to withstand the impact from subsequent application of the mixture and are able to maintain the loft or separation of fibers in spite of the weight of insulation material above. To attain the necessary velocity to cause the mixture to spray and adhere to the desired surface, the inner diameters of the spraying hoses are decreased in a stepwise fashion to produce a venturi effect. The mixture components dissociate when the mixture is introduced into a hose having a smaller inner diameter and therefore smaller cross-sectional area of flow. Each spraying hose is of a length sufficient to allow substantial remixing of the mixture of fibers and foamed adhesive material in the hose after a decrease in inner diameter.

After the mixture has been sprayed into the desired space, the adhesive material, after drying, acts to maintain the loft or separation of fibers even when the foam or liquid portion dries or dissipates. In this way, the dried, sprayed-in insulation maintains its insulation capacity by virtue of the fibers rather than the continued presence of a foam. The foam also acts to spread the adhesive for desired mixing with the fibers.

With regard to the nozzle itself, it includes a conduit that carries the foamed adhesive material and which tapers at the nozzle portion where partial mixing of the fibers and foamed adhesive material occurs. This configuration is important in preventing back flow of material into the conduit, particularly whenever the flow of materials is discontinued for a time by shutting off the pressurized air.

DETAILED DESCRIPTION OF THE PREFERRED EMBODIMENT

The present invention relates to a method and structure for insulating surfaces in existing or newly constructed buildings using foamed fiber insulation, a mixture of insulation particles and a foamed adhesive material, to form an insulating layer that adheres to the surface, thereby avoiding the need for a retaining means to hold the foamed fiber insulation in place.

Figure 1:
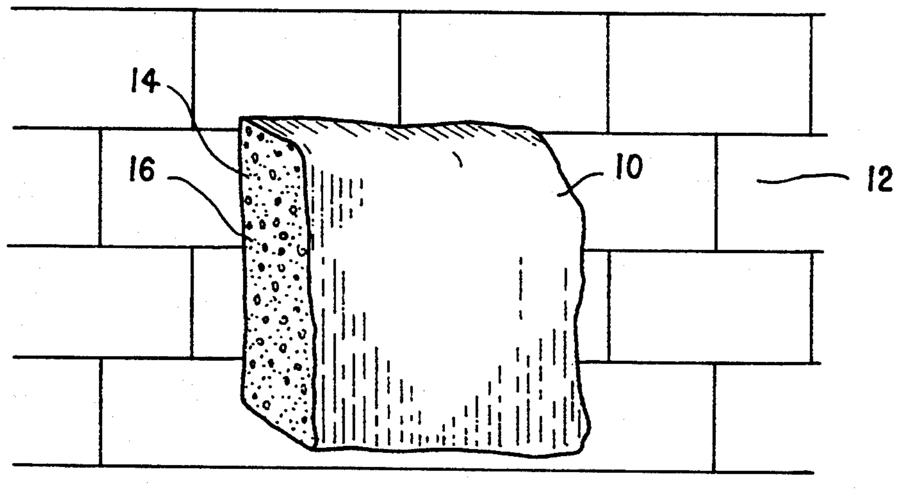
FIG. 1 is a schematic cross-sectional view of the lofted fibers and foamed adhesive insulating mixture applied to a cinder block wall.

Referring to FIG. 1, a layer of foamed fiber insulation 10 of a desired density and thickness adheres to a cinder block wall 12. The foamed fiber insulation 10 is a mixture of a foamed adhesive material 14, which includes a foam and an adhesive material, and insulation particles 16. Suitable foams must be able to maintain the loft or spreading of the insulation particles 16 during and after application. Presently known foams that are capable of this include detergents. The adhesive material may be any foamable adhesive such as polyvinyl acetate, ethylvinyl acetate, animal glues, bentonite based adhesives, plaster and the like. The insulation particles 16 may be any insulating particle known in the art including rock wool, fiberglass, cellulose, wood fiber, or combinations thereof.

The above components are mixed and then applied while in a flowable state to the cinder block wall 12 by any suitable technique. The foamed fiber insulation 10 can be applied by virtually any method that brings the foamed fiber insulation mixture into contact with the desired surface, such as spraying or troweling. A temporary or permanent retaining means may be employed but is not required as the mixture will readily adhere to and maintain its desired shape. The mixture can also be applied to any surface, however oriented, whether the surface is wood, metal, masonry, concrete, stucco, urethane, or the like. Accordingly, the mixture may be readily applied to ceilings, interior walls, floors, attics, exterior walls, roofs and other surfaces, having substantially any orientation. Many other surfaces can also be insulated. For example, the bulkhead of a ship can be insulated to prevent condensation. Further, the flowability of the mixture enables it to insulate void spaces, such as those surrounding pipe cases, wiring and air ducts, and electrical boxes, many of which are hard to reach or difficult to insulate with other methods.

The formed fiber insulation can also be applied to a surface and then separated from the surface before it cures. Afterwards, when the layer of foamed fiber insulation has cured, it can then be attached to the original surface or to another surface of substantially the same shape as the original surface. In this manner, insulation can be created for surfaces before the surfaces are in place in a structure or for surfaces remotely located from the foamed fiber insulation. For example, insulation can be created for piping that has not yet been installed in a building or, if the piping has been installed, the insulation can be constructed remotely from the building site.

Figure 2:
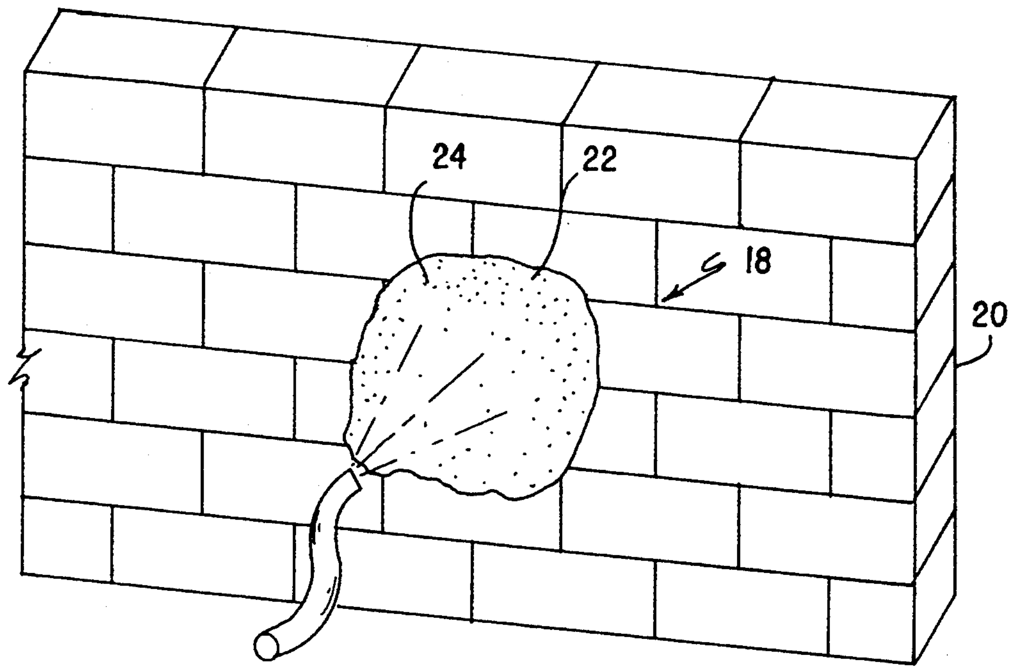
FIG. 2 is a schematic cross-sectional view of the lofted fibers and foamed adhesive insulating mixture sprayed on a cinder block wall.
Figure 3:
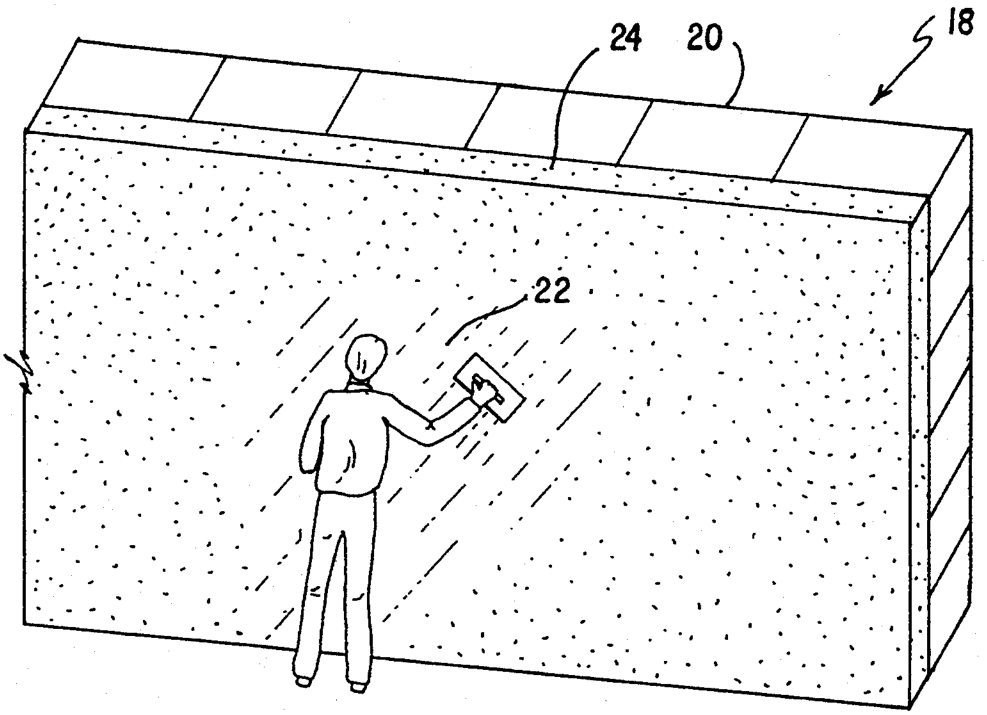
FIG. 3 is a schematic cross-sectional view of the lofted fibers and foamed adhesive insulating mixture being contoured with a trowel after application on a cinder block wall.

Referring to FIGS. 2 and 3, the ability of the mixture to form an insulation layer of desired shape and texture is illustrated. In FIG. 2, the foamed fiber insulation 18 is sprayed onto a cinder block wall 20 to a desired thickness. While still in the flowable state, the layer of foamed fiber insulation 18 is molded into a desired shape and texture by troweling and rolling. For example, when the foamed fiber insulation is applied to a flat roof, it can be molded so that it has a shape which promotes drainage. As the material is molded, the foamed adhesive material 22 rises to the surface to form a smooth surface with few exposed insulation particles 24. When cured, the foamed fiber insulation 18 retains the desired shape and thickness and the exposed layer of adhesive material 22 forms a protective coating over the insulation particles 24.

The moisture in the foamed fiber insulation 18 cures in the ambient atmosphere, without the necessity of heating or other drying procedures. The cure rate is inversely proportional to the moisture content of the foamed fiber insulation 18, which is typically about 16% to 18% and primarily attributable to the amount of adhesive material employed. When cured, the foam dissipates leaving a substantially rigid layer of insulation particles 24 encapsulated in the adhesive material 22. The adhesive material 22 maintains the loft or separation of insulation particles even after the foam has dissipated. The cured layer has a substantially homogeneous density of insulation particles 24 so as to provide a uniformity of insulation.

Figure 4:
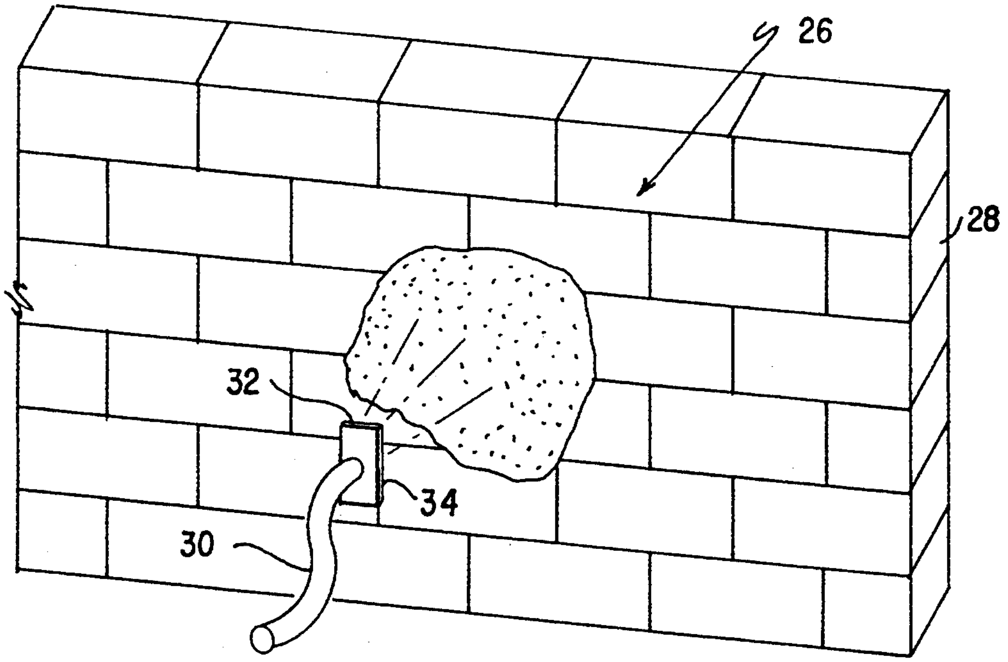
FIG. 4 is a schematic cross-sectional view of the lofted fibers and foamed adhesive insulating mixture sprayed on a cinder block wall using a second spraying hose equipped with the troweling plate.
Figure 5:
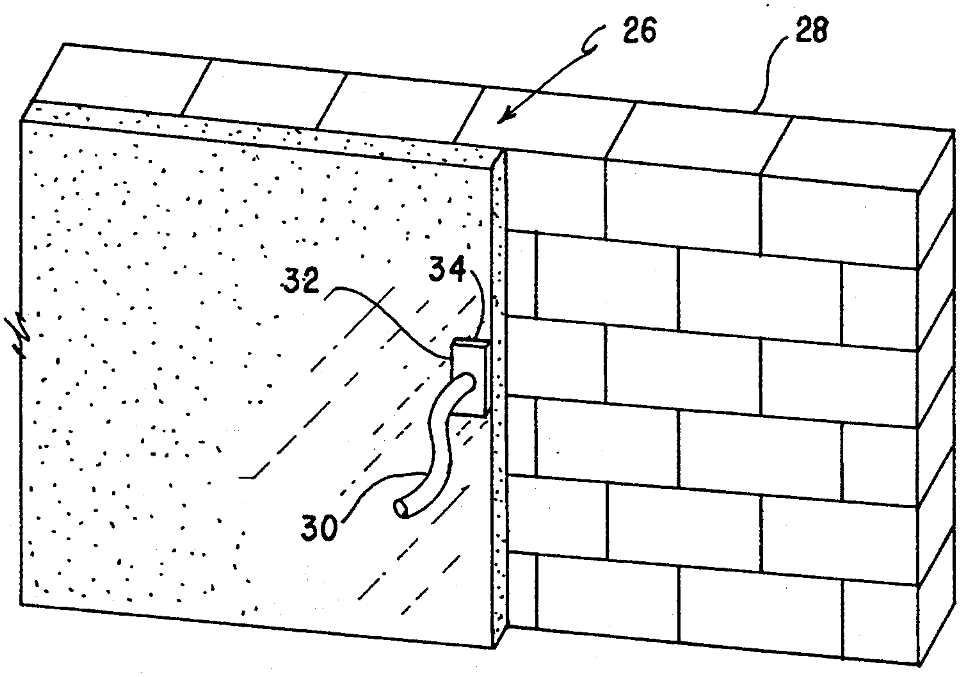
FIG. 5 is a schematic cross-sectional view of the lofted fibers and foamed adhesive insulating mixture being contoured using the second spraying hose equipped with the troweling plate.

Referring to FIGS. 4 and 5, a process to mold the surface of the foamed fiber insulation 26 substantially simultaneously with its application is depicted. In FIG. 4, foamed fiber insulation 26 is sprayed onto a surface 28 by a spraying apparatus 30 mounting a trowel 32. As shown in FIG. 5, when the foamed fiber insulation 26 has reached a desired thickness, the flat metal face 34 of the trowel 32 is moved in a back-and-forth motion to mold the surface of the foamed fiber insulation 26 into a desired shape and texture. The spray of foamed fiber insulation 26 is typically not stopped during molding so that the deposition and molding steps occur substantially simultaneously.

The smooth exterior surface of the cured foamed fiber insulation 26 permits it to be finished in the same manner as a conventional well, e.g., it may be plastered, wallpapered, painted, stuccoed, sprayed with acoustic materials, or left as is. The exterior surface may be molded to produce a flat surface suitable for the attachment of wallboard, such as drywall or paneling, or wallpaper. In addition to the above-described molding techniques, a form having a rigid, flat surface, such as a sheet of particle board or plywood, may be used as a form to provide such a flat surface. The form may be either removed or left on the surface, as desired.

Figure 6:
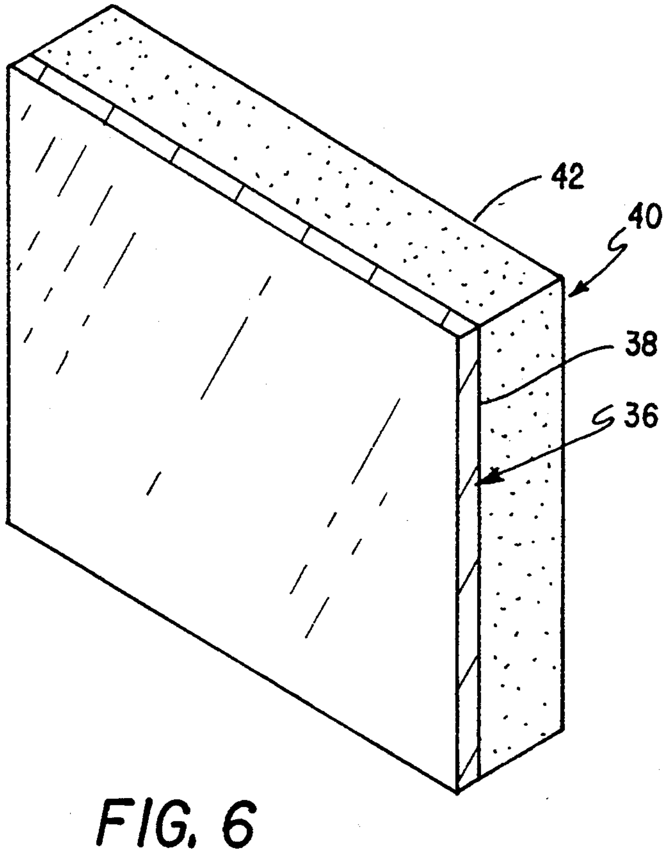
FIG. 6 is a schematic cross-sectional view of the fully cured lofted fibers and foamed adhesive insulating mixture with drywall cemented to its exterior surface.

Referring to FIG. 6, wallboard 36, such as drywall, can be cemented to the exterior surface 38 of the cured layer of foamed fiber insulation 40 adhering to wall 42. Any cement known in the art suitable for use with wallboards may be used. Preferably, the cement used has a different chemical composition from the adhesive used in the foamed fiber insulation 40. The wallboard 36 may be finished as desired after the cement has dried sufficiently. The finishing process is simplified by the avoidance of nail indentations in the wallboard which must typically be finished. Similarly, with respect to exterior walls to which the foamed fiber insulation 40 has been applied, exterior surfaces such as stucco can be applied or exterior structures like aluminum siding can be attached.

Figure 7:
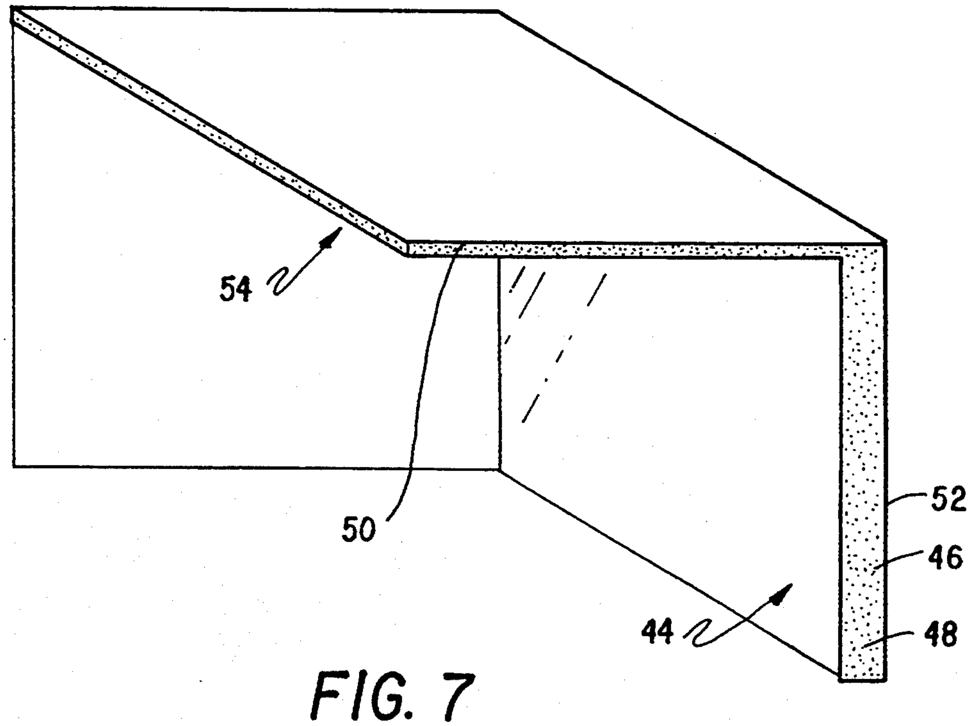
FIG. 7 is a schematic cross-sectional view of the fully cured lofted fibers and foamed adhesive insulating mixture applied to a ceiling and wall.

Referring to FIG. 7, the density and thickness of the foamed fiber insulation 44, 54 may be varied with the type of surface being insulated. The compression and tensile strengths and "R" rating of the layer of foamed fiber insulation 44, 54 are directly related to the density of insulation particles 46 and inversely related to the density of foamed adhesive material 48. In other words, the greater the density of insulation particles 46 and the lower the density of foamed adhesive material 48, the greater the compression and tensile strengths and "R" rating of the layer 44, 54. Accordingly as illustrated by FIG. 7, the insulation layer 44, 54 may be less dense in areas requiring less strength and/or a lesser "R" rating, such as ceilings 50, and more dense in areas requiring greater strength and/or a greater "R" rating, such as walls 52, which frequently contact people or heavy objects.

The thickness of the layer of foamed fiber insulation 44, 54 also varies with the type of surface to be insulated. The thicker the layer of foamed fiber insulation 44, 54, the greater the compression and tensile strength and "R" rating of the layer. A layer 44, 54 with a thickness of 0.25 inches has been found suitable in many instances. However, layers of up to six feet have presently been achieved.

The foamed fiber insulation may include a variety of additives to impart desired properties to the insulation. For example, a dye may be added to produce a layer of foamed fiber insulation of a desired color which does not require painting. Fire retardant materials may be added to produce a fire retardant foamed fiber insulation layer. Typically, a fire retardant adhesive is combined with a fire retardant insulating particle to achieve the fire retardant foamed fiber insulation. Known fire retardant adhesives include bentonite based adhesives and sodium silicate based adhesives. Known fire retardant insulating materials include mineral fibers, fiberglass, vermiculite, and perulite (an expanded sodium silicate). Additionally, accelerators can be added to the foamed fiber insulation to speed the transition from the flowable state to the rigid state by increasing the rate at which moisture evaporates from the foamed fiber insulation after application. Suitable accelerators include non-flammable solvents like alcohol.

The foamed binder may also be used for dust suppression on surfaces prior to activities such as painting. To act as a dust suppressant, the amount of insulation particles in the foamed fiber insulation mixture is attenuated to produce foamed fiber insulation with few insulation particles. The mixture is then applied to the desired surface where it encapsulates the dust particles on the surface and provides a clean, smooth surface.

Figure 8:
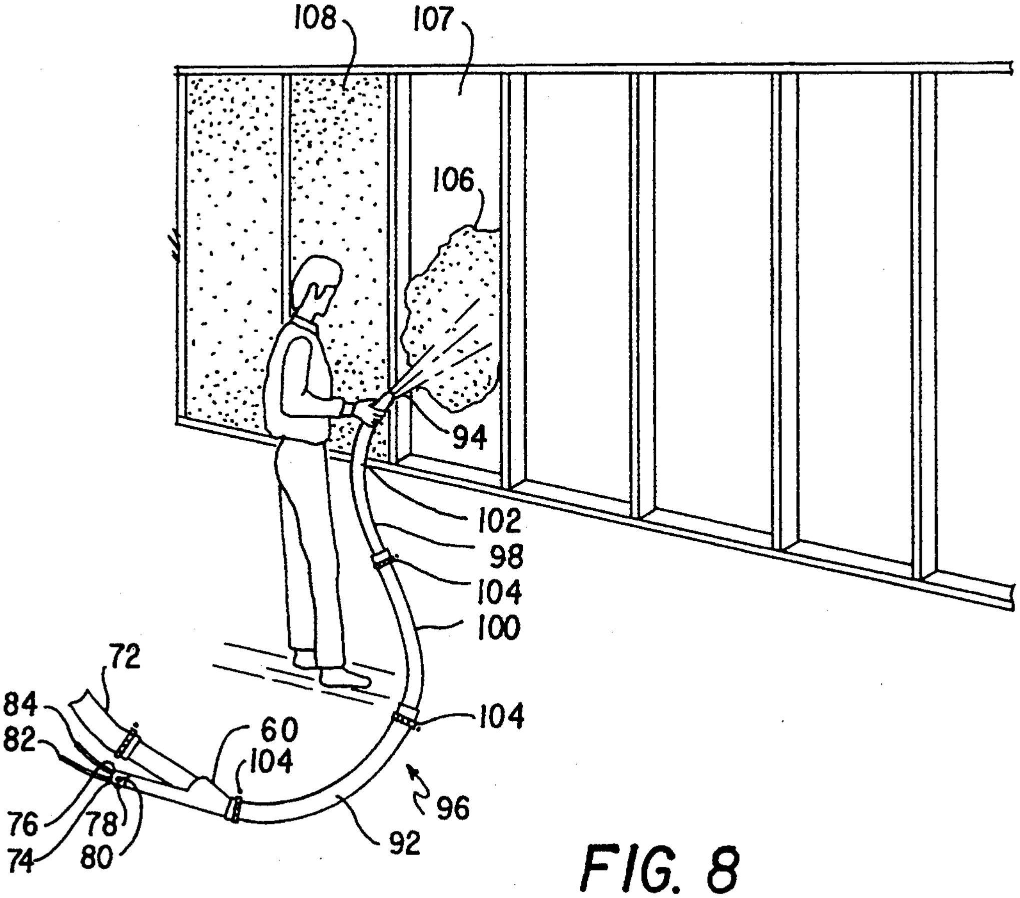
FIG. 8 is a perspective view of a structure illustrating the hose apparatus used to apply the insulation to a structure.
Figure 9:
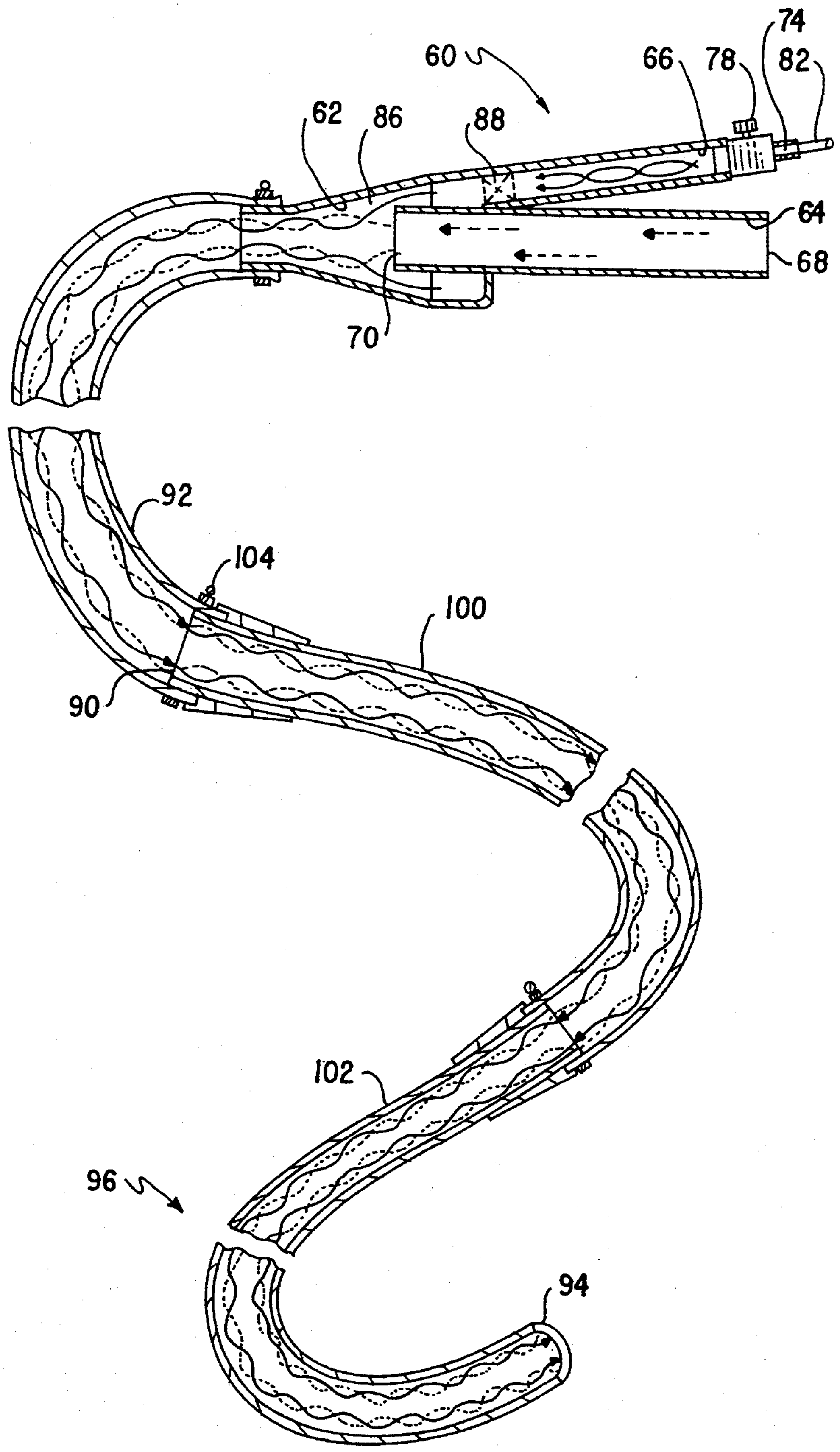
FIG. 9 is a cross-sectional view of the hose apparatus shown in FIG. 8.

An apparatus and method for mixing the foamed adhesive material with lofted fibrous insulation particles and spraying the mixture into a cavity to fill the cavity with fibrous insulation having a substantially homogeneous density is shown in FIGS. 8 and 9. As used herein, "spray" means to provide a mixture of foamed adhesive material and lofted fibrous insulation at a sufficient velocity to allow the mixture to substantially adhere to a surface while substantially reducing separation of the mixture. The apparatus used for mixing the lofted fibrous insulation and foamed adhesive material is disclosed in U.S. Pat. No. 4,768,710, to Sperber, entitled "Fibrous Blow-In Insulation Having Homogeneous Density."

Referring to FIGS. 8 and 9, a nozzle 60 includes a mixing chamber 62, a first conduit 64, and a second conduit 66. The first conduit 64 has a first entrance port 68 and a first exit port 70. The first exit port 70 communicates with the mixing chamber 62. The first entrance port 68 of the first conduit 64 is preferably connected to a hose or pipe 72 for introduction through the entrance port 68 of fibrous particles as described below. The second conduit 66 has second and third entrance ports 74, 76 controllable by first and second valves 78, 80, respectively. Connected to the second and third entrance ports 74, 76 are feed lines 82, 84 for introduction of foaming agent and adhesive material and pressurized gas, respectively. The second conduit 66 has a second exit port 86 communicating with the mixing chamber 62. In the region of the second conduit 66 near the second exit port 86, the second conduit 66 is expanded to be located outwardly of the first conduit 64, preferably surrounding the first conduit 64 as a collar. The second conduit 66 tapers towards the first conduit 64 at the mixing chamber 62. The second conduit 66 preferably contains one or more baffles or obstacles 88 to assist in foam production. The mixing chamber 62 is attached to a mixing hose or mixing pipe 92 for completing the mixing of the lofted fibers of insulation and foamed material and directing the insulation material. Based on economics, the most preferred mixing hose length is about two feet, though the longer the mixing hose 92, the more uniform the mixture of insulation particles and foamed adhesive materials. The mixing hose or mixing pipe 92 further includes a first ejection port 90.

To spray the mixture of fibrous lofted insulation particles and foamed adhesive material, it is necessary to increase the velocity of the mixture when it is ejected from a second ejection port 94. Since the increase of the velocity of the fibrous lofted insulation particles and/or foamed adhesive material in the first and/or second conduits, respectively, will prevent optimal mixing of the particles and material, the velocity of the particles and material in the first and second conduits must remain at a level below the velocity necessary to cause spraying of the mixture. The spraying assembly 96 therefore increases the velocity of the mixture by decreasing the cross-sectional area of flow.

In a preferred embodiment the spraying assembly 96 consists of two separate interconnected hoses 100 and 102 connected either to each other or the mixing hose 92 by a connecting means 104, such as a clamp and/or duct tape, with each spraying hose having a smaller inner diameter than the preceding hose and no spraying hose having an inner diameter equal to or greater than the inner diameter of the mixing hose 92. In the preferred embodiment, the inner diameter of the first ejection port 90 and mixing hose 92 is approximately 2.5 inches, the first spraying hose 100 is approximately 2 inches and the second spraying hose 102 is approximately 1.50 to approximately 1.75 inches. As shown in FIG. 9, the inner diameters of the hoses are decreased in a step-wise fashion for the reason that the mixture of fibrous lofted insulation particles and foamed adhesive material was observed to separate whenever there is any reduction in the cross-sectional area of flow of the mixture. When the inner diameter was reduced from approximately 2.5 inches to approximately 1.75 inches through the use of one spraying hose, the insulation particles and foamed adhesive material were too dissociated to apply a uniform mixture of the particles and material to the desired surface. When the desired reduction was accomplished in two spraying hoses, the spraying assembly 96 was found to apply a uniform mixture of the particles and material to the desired surface. Based on these observations, it appears that the degree of separation is directly proportional to the degree of reduction. In other words, it appears that the larger the reduction in cross-sectional area of flow, the greater the dissociation of the insulation particles from the foamed adhesive material. The gradual reduction of the cross-sectional area of flow in two stages causes an initial separation of the mixture components, followed by a gradual remixing, followed by a second separation and a second remixing. At the end of the second spraying hose 102, there is sufficient mixture and sufficient velocity to cause the foamed fiber insulation to spray. To insure sufficient remixing of the mixture components following a decrease in cross sectional area, each spraying hose should have a length of at least about one foot, though the longer the hose, the more uniform the mixture of insulation particles and foamed adhesive material. Based on economics, the most preferred spraying hose length is about two feet. An overall hose length of up to 30′–40′ has been used in many applications. As will be known and understood by those skilled in the art, the number, inner diameters, and lengths of spraying hoses may vary depending upon the desired velocity and/or desired degree of separation of the mixture components and/or volume of foamed fiber insulation that is to be applied per unit of time (the greater the volume per unit of time, the larger the diameter of the spraying hoses).

The manner of using the nozzle 60 and spraying assembly 96 and of production and placement of insulating material 106 will now be described. A foaming agent and adhesive are introduced through the first line 82 and through the second entrance port 74 into the second conduit 66, with the rate of flow being controlled by the first valve 78. Any of a number of foaming agents well known in the art can be used. Foamable adhesives such as polyvinyl acetate, ethylvinyl acetate, animal glues and the like can also be used. A pressurized gas, such as air, is introduced through the second line 84 and through the third entrance port 76 at a rate controlled by the second valve 80. Inside the second conduit 66, the pressurized air mixes with the foaming agent and adhesive materials to produce a foam and adhesive material which moves through the second conduit 66. The baffle or obstacle 88 can be used to assist in producing foam. The foam and adhesive material in its foamed state moves through the first exit port 86 of the second conduit 66 and into the mixing chamber 62 and then into the mixing hose 92.

Substantially dry, lofted fibrous particles which have been lofted by mixing with pressurized air are introduced through the first entrance port 68 into the first conduit 64. The fibrous material can be any fiber well known in the art including mineral fibers, recycled paper and fiberglass. The lofted fibers and pressurized air move through the first conduit 64 and through the first exit port 70 of the first conduit 64 into the mixing chamber 62 and then into mixing hose 92.

In the mixing chamber 62 and mixing hose 92, the foam and adhesive material in its foamed state substantially mixes with the lofted fibers. The tapered area of the second conduit 66 assists in preventing back flow of mixture into the conduits, particularly the second conduit 66. Such back flow can occur, for example, when the flow of insulation mixture through the nozzle 60 is stopped. If the flow of the mixed fibers and foamed adhesive material were permitted back into the second conduit 66, it would be necessary for the operator to frequently clean out or unplug the conduit 66 whenever flow of the mixture is stopped by the operator for some reason, such as moving the apparatus to a new cavity for filling with the insulation. The proportion in which the components are mixed, and particularly the proportion of liquid foaming material and adhesive material to pressurized gas and other material, is preferably adjusted so that the resulting mixture ejected from the second ejection port 94 has a low moisture content per volume and has the ability to adhere to a desired surface when sprayed.

The mixture of fibers and foam and adhesive material is introduced under pressure from the mixing hose 92 into the first spraying hose 100. As shown in FIG. 9, the mixture components separate when the cross-sectional area of flow is decreased. The mixture components are substantially remixed when they enter the second spraying hose 102 and the cross-sectional area of flow is decreased a second time. As before, the mixture components separate when the cross-sectional area of flow is decreased and are substantially remixed by the time the mixture is sprayed from the second ejection port 94.

As shown in FIG. 8, the mixture of fibers and foamed adhesive material 106 which is sprayed from the second ejection port 94 is directed to and received in an area 107 where insulation is desired. In a typical application, the mixture is directed into the cavity of a typical stud-construction wall 108 whereby the foamed insulation can be made and installed at the construction site. Since the present invention has the ability to spray the mixture of fibers and foamed adhesive material, the mixture may be used to install insulation in any other desired cavity, however oriented, including without limitation ceiling and floor cavities. As depicted in FIG. 1, the foamed adhesive material 10 is used to maintain loft or spreading of the insulation fibers 16 relative to each other. The material 10 maintains such loft or spreading of fibers even when it is impacted by subsequent applications of the mixture ejected from the second ejection port 94 and maintains loft or separation of fibers in spite of the weight of insulation material above.

After the mixture has been placed in the desired area 107 as depicted in FIG. 8, the mixture may be sculpted into any desired shape or texture by, for example, the use of a trowel. The moisture in the mixture dries in the ambient atmosphere, without the necessity for application of heat or other drying procedures. With the drying of the moisture, the material 106 dissipates leaving only the fibrous particles 16 and adhesive which maintained the fibrous particles in a desired, spread state.

In light of the above discussion of the preferred embodiment, a number of advantages of the present invention are apparent. First, the present invention substantially reduces the costs associated with present methods of installing insulation. In appropriate cases, it eliminates the needs for constructing a cavity, erecting a retaining structure, and painting the exterior surface of the wall and reduces the labor and materials required to finish drywall and fireproofing of the walls. Second, the unique flowability of the present invention eliminates voids in hard-to-reach places, reducing air infiltration and energy costs. Third, the present invention provides an inexpensive method to retrofit existing buildings which often possess inadequate insulation. Fourth, a sprayed-in fibrous insulation is provided which results in substantial uniformity of insulation, i.e., substantially homogeneous density. Although a foam is used, it does not have to be used to create loft or to create air pockets, but rather is used to maintain a previously-established loft between fibrous particles. Indeed, the foam itself eventually dissipates leaving lofted fibrous particle insulation. Fifth, the foamed insulation of the present invention can be made and installed on the job or construction site. Sixth, because the insulation is sprayed in rather than being a batt-type insulation, the insulation does not need to be extensively handled. Seventh, because the foam is used only to maintain an already-created loft and is not a structural component of the insulation, at least in the long-term, the foam can be relatively dry, also contributing to rapid drying of the insulation in the desired space without the requirement for application of heat. Eighth, as opposed to a permanent foam insulation, the sprayed-in fibrous insulation uses relatively inexpensive materials such as recycled paper, mineral fibers or fiberglass and is easy to apply, conforming naturally to obstacles such as wiring, pipes and the like. Ninth, a tapered nozzle portion of the present invention reduces or prevents the flow of foamed insulating material back into the conduit that carries the mixture of foaming material and adhesive. As a consequence, this conduit does not become plugged with fiber material. Tenth, unlike prior art methods of "blowing in" fibrous insulation, the mixture of foamed insulation applied by the present invention adheres to the surfaces of the desired cavity and no temporary retaining means is required to retain the insulation during installation. Eleventh, unlike the prior art, the present invention may be used to fill any desired cavity with insulation, including, for example, not only walls but also floors and ceilings. Finally, the sprayed-on insulation of the present invention may, before drying, be sculpted into any desired shape or texture by, for example, the use of a trowel.

Although the present invention has been described with reference to certain embodiments, it should be appreciated that further modifications can be effected within the spirit and scope of the invention.

What is claimed is:

1. A method for insulating a surface, comprising:

supplying loose insulation particles;

providing an adhesive material;

producing a mixture of said insulation particles, said adhesive material and a foam;

applying said mixture on a first surface that is disposed to include a vertical component with sufficient force to cause said mixture to substantially adhere to said first surface;

molding manually said mixture while in a flowable state, wherein as said molding manually step occurs said adhesive material rises to form a substantially smooth outer surface and, when cured, said outer surface has an exposed layer of said adhesive material that forms a protective coating over said insulation particles and in which the number of exposed insulation particles is few; and allowing said foam of said mixture to dissipate wherein a majority of insulation is provided by said insulation particles.

2. A method, as claimed in claim 1, wherein:

said molding step occurs substantially simultaneously with said applying step.

3. A method, as claimed in claim 1, further comprising at least one of the following:

cementing at least one panel of drywall to said exposed layer;

painting at least a portion of said exposed layer; and attaching wallpaper to said exposed layer.

4. A method, as claimed in claim 1, wherein:

said applying step includes spraying said mixture.

5. A method, as claimed in claim 1, wherein:

said molding step includes troweling.

6. A method, as claimed in claim 1, wherein:

said adhesive material is foamable and said foam includes foam generated using said foamable adhesive.

7. A method, as claimed in claim 1, further comprising:

controlling compression and tensile strengths of said insulation particles by selecting a desired ratio of density of said insulation particles to density of said foam.

8. A method, as claimed in claim 1, wherein:

said applying step includes carrying said mixture using at least first and second hoses, said second hose having an inner diameter less than an inner diameter of said first hose.

* * * * *

UNITED STATES PATENT AND TRADEMARK OFFICE

CERTIFICATE OF CORRECTION

PATENT NO. : 5,421,922

DATED : JUNE 6, 1995

INVENTOR(S) : SPERBER

It is certified that error appears in the above-identified patent and that said Letters Patent is hereby corrected as shown below:

Title page, item [73] should be deleted.

ATTORNEY, AGENT OR FIRM: SHERIDAN ROSS & McINTOSH P.C.

Signed and Sealed this

Twenty-seventh Day of February, 1996

Attest:

BRUCE LEHMAN

Attesting Officer

*Commissioner of Patents and Trademarks*